United States Patent
Miller

[11] 4,122,803
[45] Oct. 31, 1978

[54] COMBINED INTERNAL COMBUSTION AND STEAM ENGINE

[76] Inventor: Hugo S. Miller, 4133 Caflur Ave., San Diego, Calif. 92117

[21] Appl. No.: 842,065

[22] Filed: Oct. 14, 1977

[51] Int. Cl.² .............................................. F02D 21/06
[52] U.S. Cl. ................................. 123/25 P; 123/25 C; 123/25 D; 123/25 K; 123/25 M
[58] Field of Search .................. 123/25 B, 25 C, 25 D, 123/25 K, 25 M, 25 P, 193 H, 193 CH; 261/18 A

[56] References Cited

U.S. PATENT DOCUMENTS

| | | | |
|---|---|---|---|
| 1,122,770 | 12/1914 | Lake | 123/25 D |
| 1,160,602 | 11/1915 | Harwood | 123/25 D |
| 1,349,515 | 8/1920 | Lombard | 123/25 C |
| 1,398,667 | 11/1921 | Beals | 123/25 C X |
| 1,782,642 | 11/1930 | Wiley | 123/25 D |
| 1,791,523 | 2/1931 | Chaudet | 123/25 D |
| 2,748,755 | 6/1956 | McCutcheon | 123/25 C |
| 2,879,753 | 3/1959 | McKinley | 123/25 C |
| 3,911,871 | 10/1975 | Williams et al. | 123/25 K |
| 3,990,408 | 11/1976 | Knoll | 123/25 M X |
| 4,062,338 | 12/1977 | Toth | 123/25 C |

FOREIGN PATENT DOCUMENTS

| | | | |
|---|---|---|---|
| 386,185 | 6/1908 | France | 123/25 C |
| 153,256 | 1/1922 | United Kingdom | 123/25 P |

Primary Examiner—Ira S. Lazarus
Attorney, Agent, or Firm—Brown & Martin

[57] ABSTRACT

An internal combustion engine in which a compact ring type boiler pack is installed around each cylinder under the cylinder head. Water is pumped through each boiler at a rate proportional to the cylinder temperature, to maintain a proper cooling and steam injection balance, the generated steam being injected peripherally into the cylinder in pulses, timed by a valve which is controlled by movement of the inlet valve actuating mechanism of the particular cylinder. The boiler has multiple stages to ensure complete conversion of the water to steam, the peripheral steam injection providing internal cooling of the cylinder walls without interfering with normal combustion. The steam system is adaptable to existing internal combustion engines and results in reduced fuel consumption, very low pollutant emissions in the exhaust and a very efficient thermal cycle.

19 Claims, 6 Drawing Figures

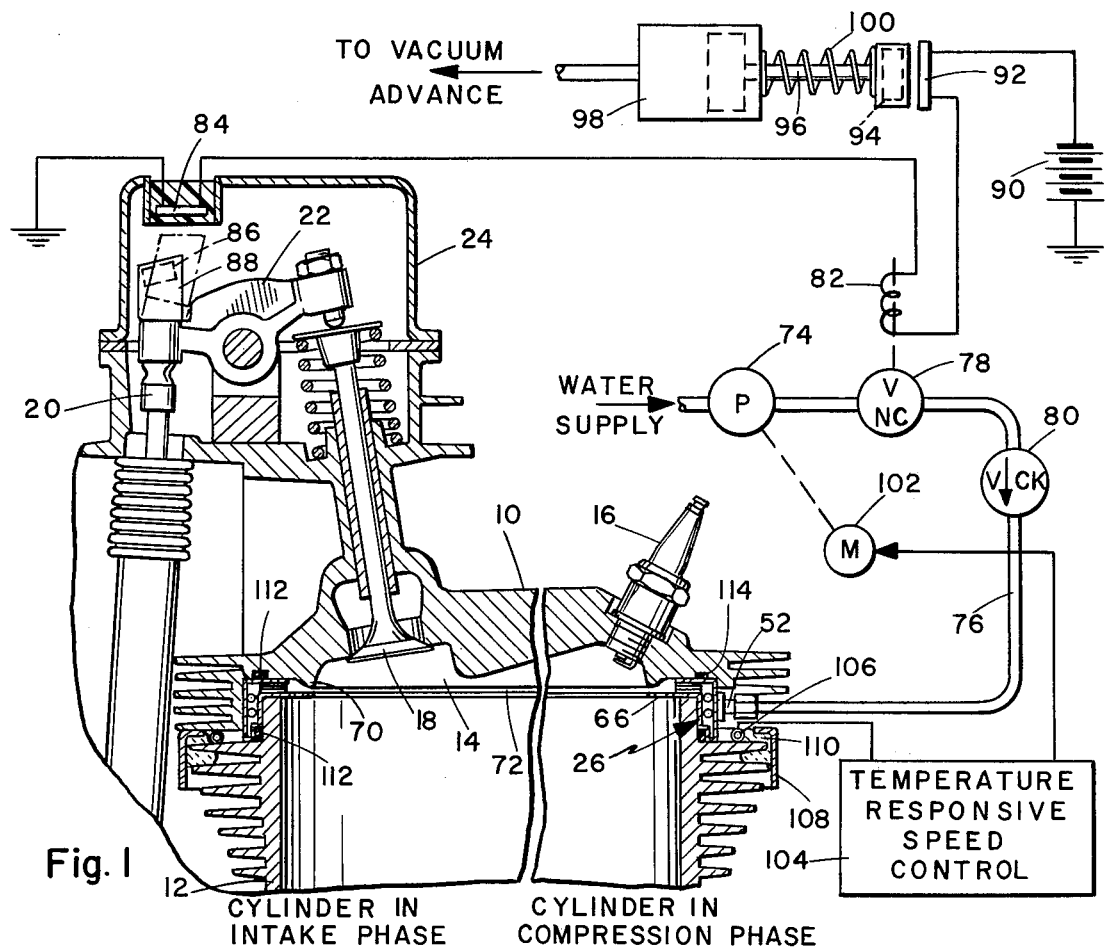
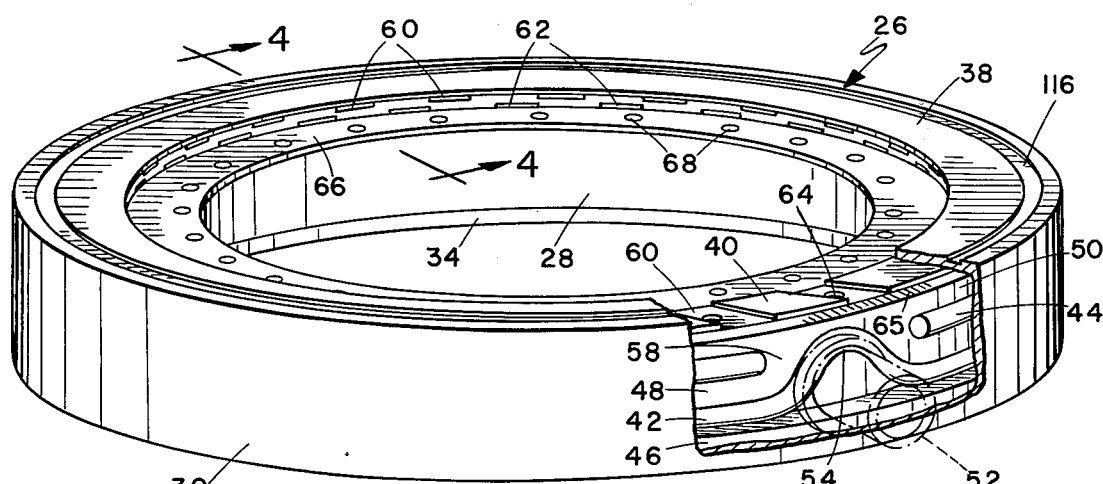
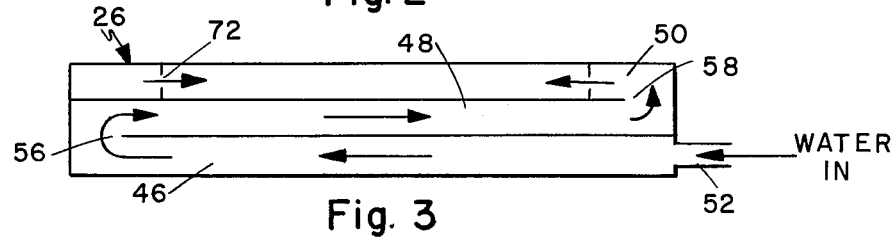
Fig. 1
Fig. 2
Fig. 3

COMBINED INTERNAL COMBUSTION AND STEAM ENGINE

BACKGROUND OF THE INVENTION

Water or steam injection systems for internal combustion engines are well known. Usually water is injected in atomized form through a nozzle in the cylinder head, or may be added to the combustible mixture. In some instances the water is heated to steam, which is then injected into the combustion chamber. Injection at or near the point of ignition lowers the initial mixture temperature and dilutes the combustible mixture at the time of ignition.

When the water is preheated, this is usually accomplished by applying a water jacket or flow path around the exhaust manifold, or some other hot portion of the engine. While this does use some of the excess engine heat, the cooling is not at the most needed location on the engine. In many instances, heat transfer is not consistent and it is difficult to match the water or steam input to the requirements of the engine, particularly at low speeds. Further, most systems require extensive modification to existing engine deisngs, or even specially designed engines.

SUMMARY OF THE INVENTION

The steam system described herein is adaptable to many existing types of internal combustion engines with a minimum of modification, and provides a very efficient thermal cycle, with reduced fuel consumption and very low pollutant emissions for a given power output.

A boiler pack is attached to each cylinder of the engine in the form of a ring member surrounding the cylinder immediately under the cylinder head, the cylinder wall and head being locally cut away to receive the ring. In most engines there is sufficient material to permit the modification, the boiler ring being very small in cross section. The boiler ring is divided by baffles so that the water makes one or more passes around the ring for maximum heat transfer, before being injected into the combustion chamber through peripheral ports in the ring at the junction of the cylinder and head. The boiler incorporates a superheating stage to ensure complete conversion to steam, which makes the thermal characteristics more consistent and controllable.

Water is supplied to the boiler under pressure from a pump which is controlled in response to cylinder temperature, to maintain a balanced thermal flow. The water is injected in pulses timed to the opening of the inlet valve of one cylinder and injected into another cylinder which is in the compression phase of the cycle. This is readily accomplished by a timed valve actuated by movement of the inlet valve rocker arm. A shut off valve, in series with the timing valve, is controlled by the vacuum advance mechanism of the engine to shut off the water supply when the engine drops suddenly to low speed, as signified by a sudden increase in vacuum at the intake. This prevents excessive steam injection and colling at sudden reductions in engine speeds.

Injection of steam into the combustion chamber effectively increases the compression ratio, but the reduced combustion temperature allows the use of low octane fuel without detonation. By injecting the steam peripherally, the combustible mixture at the point of ignition is not diluted and ignition is unimpeded. However, the expanding flame front is quickly cooled by the steam, resulting in a reduced overall combustion temperature, particularly at the cylinder walls. This reduces heating of the cylinder structure, while the lower resultant combustion temperature minimizes the production of oxides of nitrogen in the exhaust. In effect this produces a lean burn condition following ignition of a combustible mixture of balanced fuel/air ratio, which itself need not be set excessively lean. This simplifies tuning of the engine, since some preset lean burn adjustment techniques now in use are extremely critical and difficult to maintain.

The combined internal combustion and steam engine has a very efficient thermal cycle. Much of the heat generated by combustion in the basic engine is used to heat water to produce the steam, which in turn lowers the combustion temperature. By treating the exhaust to condense and extract excess water vapor, some of the water can be recycled and the temperature of the exhaust gases reduced.

The primary object of this invention, therefore, is to provide a new and improved combined internal combustion and steam engine.

Another object of this invention is to provide an internal combustion engine incorporating, at each cylinder, a boiler contained within the cylinder and head structure heated by the engine to inject steam peripherally into the cylinder.

Another object of this invention is to provide an engine having steam injection timed to the engine operation and controlled in accordance with engine temperature and speed by very simple mechanism.

A further object of this invention is to provide a combined internal combustion and steam engine having a very efficient thermal cycle, with reduced fuel consumption and minimum exhaust pollutants for a given power output.

Still another object of this invention is to provide steam injection means which is adaptable to many existing types of internal combustion engines with minimum modification.

Other objects and advantages will be apparent in the following detailed description, taken in conjunction with the accompanying drawings, in which:

FIG. 1 is a diametrical sectional view of a typical internal combustion engine cylinder and head, showing the boiler installation and associated control system.

FIG. 2 is a perspective view, partially cut away, of the boiler ring.

FIG. 3 is a diagram showing the flow through the boiler ring.

DESCRIPTION OF THE PREFERRED EMBODIMENT

Figure 4:
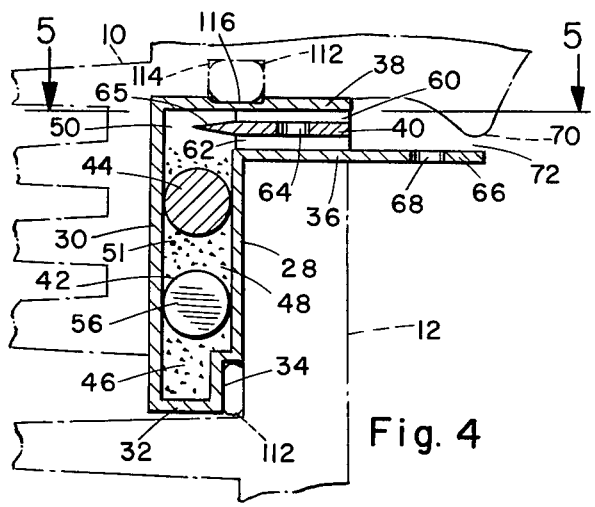
FIG. 4 is an enlarged sectional view taken on line 4—4 of FIG. 2.

A single cylinder and head structure of a typical internal combustion engine is illustrated in FIG. 1, with the individual steam boiler for that cylinder installed. As illustrated, the structure is for an air cooled engine, but the system is equally adaptable to liquid cooled engines.

A cylinder head 10 is mounted on the upper end of a cylinder 12, the head having a combustion chamber 14 with a spark plug 16 and an intake valve 18. The exhaust valve 18 is actuated by a push rod 20 through a rocker arm 22 in a conventional manner, the rocker arm being enclosed by a rocker cover 24.

A boiler pack 26 is installed between the cylinder 12 and head 10, which are milled out as necessary to receive the boiler pack. Many existing engines have sufficient material in their basic structure to accommodate the boiler pack, which is very thin and compact.

Figure 5:
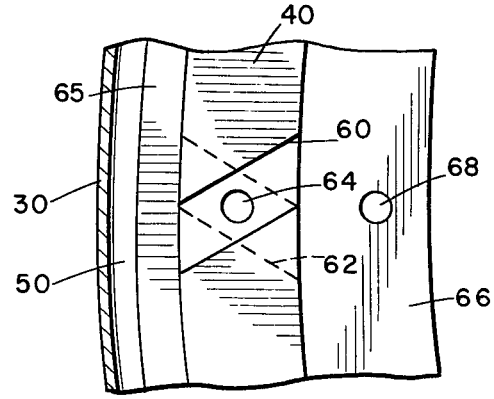
FIG. 5 is a sectional view taken on line 5—5 of FIG. 4.

The boiler pack, shown in detail in FIGS. 2, 4 and 5, is a hollow ring member having an inner cylindrical wall 28 and a concentric outer wall 30, joined at their lower edges by a bottom wall 32. The lower portion of inner wall 28 has an inset circumferential channel 34 to receive an O-ring, as later described. The upper edge of inner wall 28 has a radially inwardly projecting flange 36. The upper edge of outer wall 30 has a similar inwardly projecting flange 38, spaced above and parallel to flange 36. Fixed between flanges 36 and 38 is a circumferential superheat ring 40.

Between the inner and outer walls 28 and 30 are vertically spaced baffle rings 42 and 44, dividing the space between the walls into a lower or first annular chamber 46, a second annular chamber 48 and an upper or distributing chamber 50. The chambers could be filled with a porous thermally conductive material 51 which would improve heat transfer and reduce the actual volume of fluid in the chambers. Outer wall 30 has a water inlet connection 52 and, at the point of inlet, the lower baffle ring 42 has an upwardly looped portion 54 over the inlet, to direct incoming water into the first chamber 46. Diametrically opposite the looped portion 54, the baffle ring 42 has a gap 56, indicated in FIGS. 3 and 4, to allow the water to pass into the second chamber 48. Above the looped portion 54, the upper baffle ring 44 has a gap 58 through which the water passes to the distributing chamber. The water thus passes twice around the boiler ring before entering the distributing chamber. It should be noted that additional baffle rings could be used to form additional chambers and increase the number of passes, depending on the amount of heat transfer required.

The superheat ring 40 has a plurality of upper and lower ports 60 and 62, respectively, in the form of thin flat slots forming channels between the ring and the enclosing flanges 38 and 36. Ports 60 and 62 are circumferentially spaced in vertically opposed pairs, the ports of each pair being inclined in opposite directions to the radius of the ring, to direct the steam into the cylinder with a swirling action. At the intersection of each pair of ports is a transfer hole 64 through the ring, as in FIG. 5. Superheat ring 40 also has a peripheral blade portion 65 projecting outwardly into distributing chamber 50, to split the flow the the ports 60 and 62.

Lower flange 36 has an inner ring portion 66 extending beyond upper flange 38 and projecting into the upper periphery of cylinder 12. Ring portion 66 has a plurality of circumferentially spaced holes 68 therein adjacent the inner edge to increase the effective heat transfer of the ring portion. The outer edge of the combustion chamber 14 has a downwardly protruding lip 70, formed when the head is milled out for the boiler pack. Lip 70 is closely spaced above ring portion 66, forming a circumferential, inwardly opening injection slot 72. By installing the boiler pack within the engine structure, almost the entire surface area of the ring member is in thermally conducting contact with the engine.

Water from a suitable source is supplied through a pump 74 and a supply line 76 to inlet connection 52. In series in the supply line 76 are a control valve 78 and a check valve 80, the latter preventing blow back from pressure in the cylinder. As illustrated, control valve 78 is normally closed and is opened by a solenoid 82 in time with the engine cycle.

Installed in the rocker cover 24 is a magnetically actuated switch 84, such as a readily available mercury diaphragm switch, which is rigidly mounted in any suitable manner. A magnet 86 is attached to the rocker arm 22 on a support 88, so that each time the intake valve 18 opens, the magnet approaches and actuates switch 84, as indicated in the broken line position in FIG. 1. Switch 84 is connected through solenoid 82 to a battery 90, to open control valve 78 of the cylinder which is in the compression cycle, each time the switch 84 is actuated by movement of the rocker arm. It should be noted that a mechanical connection between rocker arm 22 and control valve 78 could be used in place of the electrical system shown.

To prevent flooding of the engine by excess water when speed is reduced, or during low speed running, the solenoid 82 is also controlled by a second magnetic shut off switch 92 in series with switch 84. Shut off switch 92 is held closed by a holding magnet 94 on the plunger 96 of a vacuum actuator 98. The plunger is biased by a spring 100 to keep holding magnet 94 in close proximity to switch 92. Actuator 98 is connected to the vacuum advance, or to an intake source of vacuum on the engine. When engine speed is reduced the vacuum pull increases and the actuator 98 retracts plunger 96 and magnet 94 allowing switch 92 to open and de-energize solenoid 82. This closes valve 78 and shuts off the water supply to the boiler pack. When the engine speed picks up, vacuum is reduced and actuator 98 releases plunger 96, so that magnet 94 can close switch 92. Control valve 78 is then again responsive to control by switch 84.

Pump 74 is driven by a motor 102 which is controlled by a temperature responsive speed control 104, the basic arrangement being well known. A thermal sensor 106 is installed around the boiler pack 26 and is protected by a baffle 108 and insulation material 110 from cooling air flow around the engine, which could cause incorrect temperature readings. The sensor 106 thus detects cylinder temperature and the speed control 104 adjusts the water flow rate accordingly to maintain proper heat balance. In a multi-cylinder engine, the speed control could respond to an average of all the sensors, or to the highest temperature cylinder, depending on the particular engine installation.

The boiler pack is sealed to the cylinder 12 by an O-ring 112 seated in channel 34, and is sealed to head 10 by a further O-ring 112 held between a channel 114 in the head and a shallow groove 116 in upper flange 38. The O-rings are of conventional high temperature resistant type, such as copper covered asbestos.

As indicated in FIG. 3, the water passes around chamber 46, through gap 56, back around chamber 48 and through gap 58 to the distributing chamber 50. The water will normally be converted to steam at this stage and will pass through ports 60 and 62 of the superheat ring 40, to be injected into the cylinder through injection slot 72 and holes 68. If any liquid remains at the superheat ring it will be momentarily trapped in transfer holes 64 and converted to steam. Ring portion 66, which extends into the cylinder and is subjected to the heat of combustion, becomes very hot and acts as a final liquid vaporizer. Heat from ring portion 66 is also conducted to the superheat ring 40 for maximum heating effect. In normal operation only superheated steam would be injected into the cylinder, the final heating stages being used to accommodate temporary imbalance which may occur during substantial and abrupt speed changes in the engine.

The basic fuel/air mixture drawn into the cylinder need not be critically lean, as in some engines set for lean burn to reduce exhaust pollution. The primary ignition takes place unimpeded and, as the flame front spreads outwardly, the superheated steam mixes with and cools the hot gases. Injection of the steam in a swirling action through the inclined ports of the superheat ring ensures good mixing. The steam adds to the volume of gases in the cylinder and effectively increases the compression ratio, but the cooling effect inhibits detonation. This allows the use of fuel of a lower octane rating than would normally be used with such a compression ratio. It should be noted that the water could include additives such as alcohol, or the like, according to the particular engine and performance characteristics. In addition to the cooling action in the combustion chamber, the engine is further cooled by the extraction of heat to convert the water to steam.

At starting, when the engine is cold and no steam is being generated, the compression ratio is very low and low octane fuel is satisfactory. As the engine heats up, the steam is injected and the compression ratio rises, but the cooling effect of the steam prevents detonation at the higher compression ratio. The reduced combustion temperature in the cylinder reduces production of hydrocarbons and oxides of nitrogen, which normally increase as combustion temperature rises.

Figure 6:
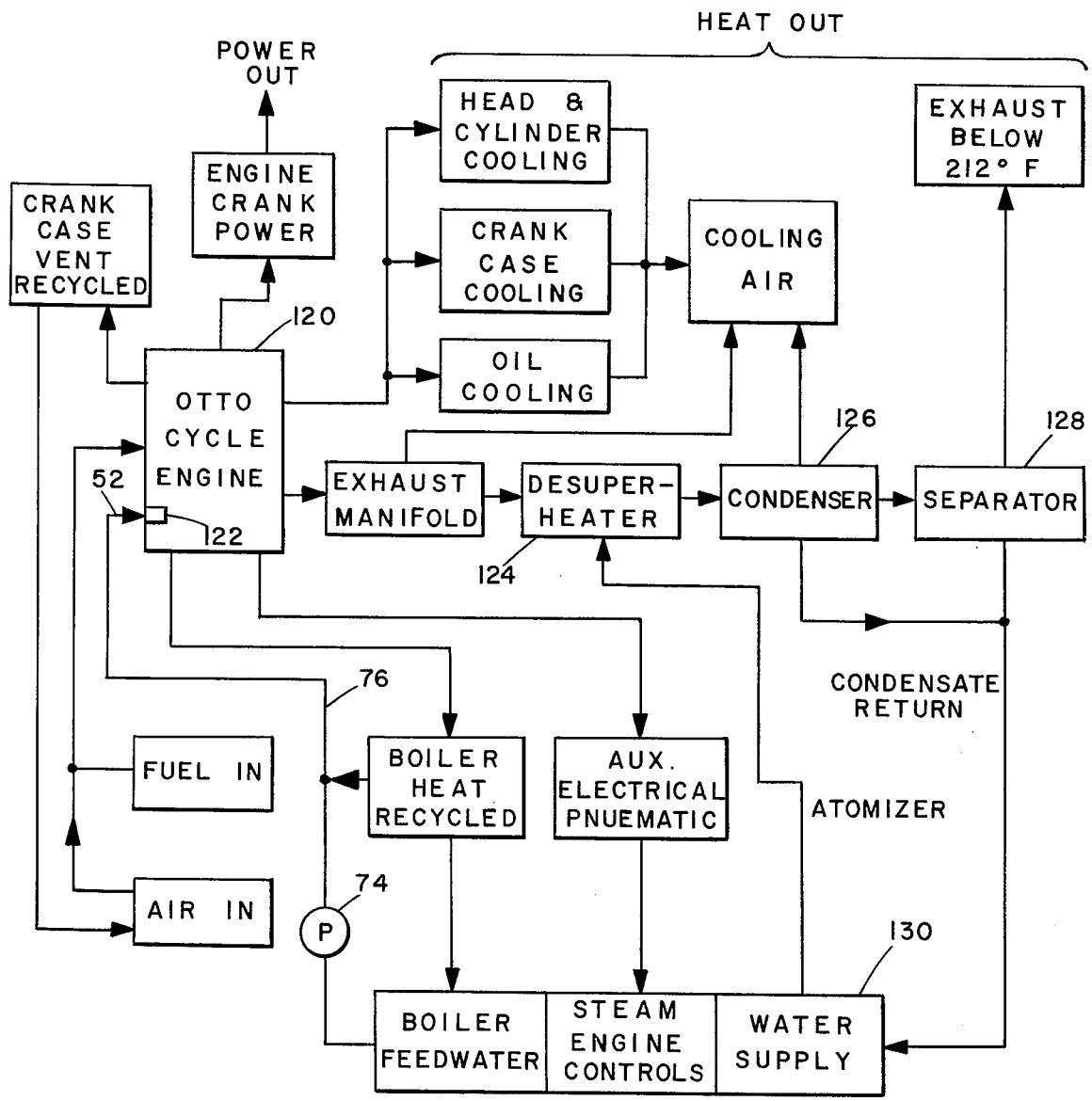
FIG. 6 is an energy flow diagram of the combined engine.

The thermal efficiency of the engine can be further improved by treating the exhaust, as indicated in the energy flow diagram in FIG. 6. Heat output of the engine 120 is partially recycled to heat the water in the boilers 122, the excess heat being carried off by cooling air in cooling the heads and cylinders, crankcase and oil. The exhaust is fed through a desuperheater 124, in which the steam rich exhaust is cooled by atomized water injection. The steam is condensed in a condenser 126, the water droplets are separated by a centrifugal separator and condensate is returned to the water supply tank 130. This type of water cooling of exhaust gases and the associated apparatus are well known. The resultant exhaust products are below the temperature of the boiling point of water and have a very low content of pollutants.

An engine installed in a vehicle and fitted with the steam system, as shown and described, has been tested under various driving conditions. It has been found that fuel consumption was decreased and that engine operating temperature was reduced from normal. Pollutant content of the exhaust was also greatly reduced.

Having described my invention, I claim:

1. In combination with an internal combustion engine having at least one cylinder, a head secured on said cylinder, said head having a combustion chamber with ignition means and timed fuel inlet control means therein, the improvement comprising:

a boiler pack surrounding said cylinder between the cylinder and the head and being in thermally conducting engagement therewith;

said boiler pack comprising a hollow ring member having at least one water conducting chamber therein, with a water inlet having means for connection to a source of pressurized water;

said ring member having a substantially circumferential steam injection slot opening into said cylinder;

a control valve connected between said water inlet and said source of pressurized water;

and timing means actuated by said timed fuel inlet control means to open said control valve and release water into said injection slot when the cylinder is in the compression phase of the engine cycle.

2. The structure of claim 1, wherein said ring member has baffles therein defining interconnected circumferential chambers, including a distributing chamber communicating with said injection slot.

3. The structure of claim 2, and including a superheat ring in said ring member between said distributing chamber and said injection slot, said superheat ring having steam conducting ports inclined to the radius to direct steam in a swirling pattern into the cylinder.

4. The structure of claim 1, and including shut off means responsive to a sudden reduction in engine speed, said shut off means being coupled to said control valve to shut off water flow when engine speed is suddenly reduced.

5. The structure of claim 1, wherein said source of pressurized water includes a pump having a drive motor, and speed control means coupled to said motor and being responsive to the temperature of the cylinder adjacent the boiler pack to vary the pumped water flow in proportion to cylinder temperature.

6. The structure of claim 1, wherein said ring member has a cylindrical inner wall and a concentric outer wall with a closed lower end, said inner wall having an upper edge with an inwardly extending lower flange, said outer wall having an upper edge with an inwardly extending upper flange spaced from the lower flange, a superheat ring fixed between said flanges and having steam conducting ports communicating from said chamber to said injection slot.

7. The structure of claim 6, wherein said ports comprise upper and lower slots in said superheat ring, the slots being in opposed intersecting pairs inclined in opposite directions to the radius, and said superheat ring having a blade portion projecting outwardly into said chamber between the upper and lower slots.

8. The structure of claim 7, and including a transfer hole through said superheat ring between and interconnecting each pair of slots.

9. The structure of claim 6, wherein said lower flange has an inner ring portion projecting beyond said upper flange into the cylinder.

10. The structure of claim 9, wherein said combustion chamber has a peripheral lip spaced from said inner ring portion and defining said injection slot therebetween.

11. The structure of claim 10, wherein said inner ring portion has a plurality of holes therethrough adjacent the inner periphery.

12. The structure of claim 6, wherein said ring member has circumferential baffles fixed between the inner and outer walls to define successive interconnected chambers between said water inlet and said superheat ring.

13. The structure of claim 12, wherein said baffles have gaps therein in diametrically opposed succession, so that each chamber extends for the full circumference of the ring member.

14. The structure of claim 1, wherein said timed fuel inlet control means includes an intake valve having a rocker arm operatively coupled thereto, said timing means being actuated by said rocker arm.

15. The structure of claim 14, wherein said timing means includes a magnet mounted on said rocker arm, and a magnetically actuated timing switch mounted adjacent the rocker arm to be operated by the magnet each time the rocker arm moves to open the intake valve.

16. The structure of claim 15, wherein said control valve has an actuating solenoid, said timing switch being connected to said solenoid and to a source of power.

17. The structure of claim 16, and including shut off means having a switch in series with said timing switch, said shut off means being responsive to a sudden reduction in engine speed.

18. The structure of claim 17, wherein said shut off switch is magnetically actuated, said shut off means including a holding magnet movably mounted adjacent the shut off switch, and means actuated by a sudden reduction in engine speed to withdraw the holding magnet from the shut off switch.

19. The structure of claim 1, wherein at least a portion of said chamber contains a porous thermally conductive fluid conveying material.

* * * * *